United States Patent
Ritsema et al.

(10) Patent No.: US 12,548,984 B2
(45) Date of Patent: Feb. 10, 2026

(54) SPARK PLUG ELECTRODE HAVING THERMALLY RESILIENT JOINT AND METHOD OF MANUFACTURING THE SAME

(71) Applicants: FEDERAL-MOGUL IGNITION LLC, Southfield, MI (US);
FEDERAL-MOGUL IGNITION GMBH, Neuhaus-Schierschnitz (DE)

(72) Inventors: Nicholas Ritsema, Brighton, MI (US);
Hans Lipp, White Lake, MI (US);
Daniel Konig, Rodental (DE)

(73) Assignees: FEDERAL-MOGUL IGNITION LLC, Southfield, MI (US);
FEDERAL-MOGUL IGNITION GMBH, Neuhaus-Schierschnitz (DE)

(*) Notice: Subject to any disclaimer, the term of this patent is extended or adjusted under 35 U.S.C. 154(b) by 285 days.

(21) Appl. No.: 17/408,097

(22) Filed: Aug. 20, 2021

(65) Prior Publication Data
US 2022/0059999 A1 Feb. 24, 2022

Related U.S. Application Data

(60) Provisional application No. 63/068,607, filed on Aug. 21, 2020.

(51) Int. Cl.
*H01T 13/39* (2006.01)
*B22F 10/28* (2021.01)
(Continued)

(52) U.S. Cl.
CPC .............. *H01T 13/39* (2013.01); *B22F 10/28* (2021.01); *H01T 13/16* (2013.01); *H01T 13/20* (2013.01);
(Continued)

(58) Field of Classification Search
CPC ......... H01T 21/02; H01T 13/16; H01T 13/20; H01T 13/39; B22F 10/28
See application file for complete search history.

(56) References Cited

U.S. PATENT DOCUMENTS 6,621,198 B2  9/2003  Kanao et al.
7,385,339 B2  6/2008  Lineton et al.
(Continued)

FOREIGN PATENT DOCUMENTS

CN   103094842 A    5/2013
CN   103457160 A   12/2013
(Continued)

OTHER PUBLICATIONS

Pavel Krakhmalev et a.; Microstructure, Solidification Texture, and Thermal Stability of 316 L Stainless Steel Manufactured by Laser Powder Bed Fusion; MDPI Journal; Aug. 15, 2018.
(Continued)

*Primary Examiner* — Abdulmajeed Aziz
*Assistant Examiner* — Steven Y Horikoshi
(74) *Attorney, Agent, or Firm* — Reising Ethington P.C.

(57) ABSTRACT

A spark plug electrode with an electrode tip formed on an electrode base using an additive manufacturing process, such as a powder bed fusion technique. The spark plug electrode includes an electrode base, an electrode tip that is formed on the electrode base and includes a precious metal-based material, and a thermally resilient joint that is located between the electrode base and the electrode tip, wherein the electrode tip and the thermally resilient joint together include a number of laser deposition layers.

20 Claims, 6 Drawing Sheets

(51) Int. Cl.
*H01T 13/16* (2006.01)
*H01T 13/20* (2006.01)
*H01T 21/02* (2006.01)
*B33Y 10/00* (2015.01)
*B33Y 80/00* (2015.01)

(52) U.S. Cl.
CPC .............. *H01T 21/02* (2013.01); *B33Y 10/00* (2014.12); *B33Y 80/00* (2014.12)

(56) References Cited

U.S. PATENT DOCUMENTS

| | | | |
|---|---|---|---|
| 7,385,355 B2 | 6/2008 | Kusunoki et al. | |
| 7,569,979 B2 | 8/2009 | Lykowsi et al. | |
| 7,666,047 B2 | 2/2010 | Suzuki et al. | |
| 7,740,683 B2 | 6/2010 | Thorsson et al. | |
| 7,795,790 B2 | 9/2010 | Lineton | |
| 7,891,095 B2 | 2/2011 | Jonsson et al. | |
| 8,348,709 B1 | 1/2013 | Passman et al. | |
| 9,077,158 B2 | 7/2015 | Murayama et al. | |
| 9,130,358 B2 | 9/2015 | Ma | |
| 9,662,840 B1 | 5/2017 | Buller | |
| 9,739,192 B2 | 8/2017 | Willi | |
| 9,800,023 B2 | 10/2017 | Niessner et al. | |
| 9,806,500 B2 | 10/2017 | Sakairi et al. | |
| 9,853,423 B1 | 12/2017 | Sumoyama et al. | |
| 9,893,361 B1 | 2/2018 | Jaker | |
| 10,008,832 B2 | 6/2018 | Quest et al. | |
| 10,328,526 B2 | 6/2019 | Ols et al. | |
| 10,415,122 B2 | 9/2019 | Barthelemy et al. | |
| 10,744,590 B2 | 8/2020 | Maier et al. | |
| 10,897,123 B2 | 1/2021 | Abe | |
| 10,913,257 B2 | 2/2021 | Coupland et al. | |
| 11,189,993 B2 | 11/2021 | Grabner et al. | |
| 2001/0013746 A1 | 8/2001 | Kanao | |
| 2004/0129683 A1* | 7/2004 | Torii | H01T 13/39 219/117.1 |
| 2004/0140745 A1* | 7/2004 | Hrastnik | H01T 13/39 313/141 |
| 2006/0028106 A1* | 2/2006 | Lineton | H01T 21/02 313/139 |
| 2009/0277540 A1* | 11/2009 | Langlet | B22F 12/20 148/522 |
| 2012/0194056 A1* | 8/2012 | Ma | H01T 21/02 445/7 |
| 2013/0313960 A1* | 11/2013 | Francesconi | H01T 13/16 313/140 |
| 2014/0049151 A1 | 2/2014 | Murayama et al. | |
| 2014/0170598 A1 | 6/2014 | Abend | |
| 2015/0223869 A1 | 8/2015 | Mayer et al. | |
| 2016/0003150 A1 | 1/2016 | DiCintio et al. | |
| 2016/0082511 A1 | 3/2016 | Cui et al. | |
| 2016/0218489 A1 | 7/2016 | DiCintio et al. | |
| 2016/0243650 A1 | 8/2016 | Lin et al. | |
| 2016/0298213 A1 | 10/2016 | Yang et al. | |
| 2016/0312338 A1 | 10/2016 | Miller | |
| 2017/0062798 A1 | 3/2017 | Wang et al. | |
| 2017/0107946 A1 | 4/2017 | Le Cras et al. | |
| 2017/0167357 A1 | 6/2017 | Maier | |
| 2017/0167358 A1 | 6/2017 | Maier et al. | |
| 2017/0179472 A1 | 6/2017 | Allie et al. | |
| 2017/0252854 A1 | 9/2017 | Maier et al. | |
| 2017/0253536 A1 | 9/2017 | Danforth et al. | |
| 2017/0264083 A1 | 9/2017 | Niessner et al. | |
| 2017/0304894 A1 | 10/2017 | Buller | |
| 2017/0331260 A1* | 11/2017 | Quest | H01T 21/02 |
| 2017/0350590 A1 | 12/2017 | Choudhri et al. | |
| 2019/0366585 A1 | 12/2019 | Nagai et al. | |
| 2020/0021084 A1* | 1/2020 | Kimura | H01T 13/39 |
| 2020/0207069 A1* | 7/2020 | Coupland | B32B 15/018 |
| 2020/0251872 A1* | 8/2020 | Drachenberg | G02B 26/103 |
| 2020/0399744 A1* | 12/2020 | Smith | C22C 1/0433 |
| 2021/0086279 A1 | 3/2021 | Clover et al. | |
| 2021/0273417 A1 | 9/2021 | Ritter et al. | |

FOREIGN PATENT DOCUMENTS

| | | |
|---|---|---|
| CN | 203387050 U | 1/2014 |
| CN | 104923797 A | 9/2015 |
| CN | 206065410 U | 4/2017 |
| CN | 106735273 A | 5/2017 |
| CN | 106881509 A | 6/2017 |
| CN | 107891200 A | 4/2018 |
| CN | 109332694 A | 2/2019 |
| CN | 110125399 A | 8/2019 |
| CN | 110899695 A | 3/2020 |
| CZ | 2013212 A3 | 10/2014 |
| DE | 102012223239 A1 | 6/2014 |
| DE | 102016209094 A1 | 11/2017 |
| DE | 102016216963 A1 | 3/2018 |
| DE | 102017221136 A1 | 5/2019 |
| DE | 102017221137 A1 | 5/2019 |
| DE | 102018200349 A1 | 7/2019 |
| DE | 102018212894 A1 | 2/2020 |
| EP | 1594200 B1 | 11/2007 |
| EP | 1596482 B1 | 6/2011 |
| EP | 2727898 A1 | 5/2014 |
| EP | 3263524 A1 | 1/2018 |
| FR | 3095149 A1 | 10/2020 |
| GB | 2544465 A | 5/2017 |
| JP | 2002359053 A | 12/2002 |
| JP | 2009270130 A | 11/2009 |
| JP | 2014072037 A | 4/2014 |
| KR | 100400101 B1 | 9/2003 |
| WO | WO9807220 A1 | 2/1998 |
| WO | 2005025783 A1 | 3/2005 |
| WO | 2006017687 A2 | 2/2006 |
| WO | 2013128416 A2 | 9/2013 |
| WO | 2015173790 A1 | 11/2015 |
| WO | WO2016116385 A1 | 7/2016 |
| WO | WO2016156973 A1 | 10/2016 |
| WO | WO2019025795 A1 | 2/2019 |
| WO | WO2021253061 A1 | 12/2021 |

OTHER PUBLICATIONS

US 10576577 B2, Jun. 14, 2007, Didier Le Breis (withdrawn).
International Search Report and Written Opinion Issued for PCT/US2021/046933 on Dec. 8, 2021; 9 pages.
International Preliminary Report on Patentability issued for PCT/US2021/046933 on Feb. 16, 2023.

\* cited by examiner

SPARK PLUG ELECTRODE HAVING THERMALLY RESILIENT JOINT AND METHOD OF MANUFACTURING THE SAME

RELATED APPLICATION

This application claims the priority of U.S. provisional application No. 63/068,607, filed Aug. 21, 2020, the entire contents of which are hereby incorporated by reference.

FIELD

The present invention generally relates to spark plugs and other ignition devices and, in particular, to spark plug electrodes and other components that are made using additive manufacturing processes.

BACKGROUND

Spark plugs are used to initiate combustion in internal combustion engines. Typically, spark plugs ignite an air/fuel mixture in a combustion chamber so that a spark is produced across a spark gap between two or more electrodes. The ignition of the air/fuel mixture by means of the spark triggers a combustion reaction in the combustion chamber, which is responsible for the power stroke of the engine. The high temperatures, the high electrical voltages, the rapid repetition of combustion reactions, and the presence of corrosive materials in the combustion gases can create a harsh environment in which the spark plug must function. The harsh environment can contribute to an erosion and/or corrosion of the electrodes, which can negatively affect the performance of the spark plug over time.

To reduce erosion and/or corrosion of the electrodes, various kinds of precious metals and alloys have been used, such as those having platinum and iridium. These materials are expensive, however. Consequently, the manufacturers of spark plugs try to minimize the quantity of precious metals used in an electrode. One approach involves using precious metals only on an electrode tip or on a sparking section of the electrodes, i.e. in the place where a spark jumps across the spark gap, as opposed to the entire electrode body itself.

Various joining techniques, such as resistance and laser welding, have been used for attaching a precious metal electrode tip to an electrode body. However, when a precious metal electrode tip is joined to an electrode body, such as a body made from a nickel alloy, there can be a substantial amount of thermal and/or other stresses on the joint during operation due to the different properties of the materials (e.g., different coefficients of thermal expansion, different melting temperatures, etc.). These stresses, in turn, can undesirably lead to cracking or other damage to the electrode body, the electrode tip, the joint connecting the two components, or a combination thereof.

SUMMARY

According to one embodiment, there is provided a spark plug electrode, comprising: an electrode base; an electrode tip that is formed on the electrode base and includes a precious metal-based material; and a thermally resilient joint that is located between the electrode base and the electrode tip, wherein the electrode tip and the thermally resilient joint together include a plurality of laser deposition layers.

In accordance with various embodiments, the spark plug electrode may have any one or more of the following features, either singly or in any technically feasible combination:

the electrode base is an integral component of a main electrode body, and the electrode base and the main electrode body are made from a same nickel-based material;

the electrode base is a separate component and is welded to a main electrode body, and the electrode base and the main electrode body are made from a same nickel-based material or a different nickel-based material;

the electrode tip is a cylindrical component that is formed on an axial end or a side surface of the electrode base;

the electrode tip is an annular component that is formed on an outer circumferential side of the electrode base;

the plurality of laser deposition layers have an average layer thickness Y between 20 μm and 60 μm;

the sum of the plurality of laser deposition layers has an electrode tip height X between 0.1 mm and 1.0 mm;

the electrode base includes a nickel-based material, and the thermally resilient joint includes both the nickel-based material and the precious metal-based material;

the thermally resilient joint includes a first laser deposition layer and a second laser deposition layer that is further from the electrode base than is the first laser deposition layer, the first laser deposition layer has a first proportion of precious metal-based material to total material, the second laser deposition layer has a second proportion of precious metal-based material to total material, and the second proportion is higher than the first proportion;

the proportion of precious metal-based material to total material in the thermally resilient joint continuously increases from the first laser deposition layer to the second laser deposition layer to form a tailored composition gradient;

the proportion of precious metal-based material to total material in the thermally resilient joint is the same for a first group of laser deposition layers that includes the first laser deposition layer, and the proportion of precious metal-based material to total material increases from the first group of laser deposition layers to the second laser deposition layer to form a tailored composition gradient;

the second laser deposition layer is adjacent the electrode tip, and the second laser deposition layer has a proportion of precious metal-based material to total material that is greater than or equal to 50%;

at least one of the plurality of laser deposition layers includes rows and columns to form a lattice or grid-like pattern;

the lattice or grid-like pattern includes a plurality of peaks and a plurality of valleys, the plurality of valleys correspond to locations where a laser or electron beam has impinged the electrode, and the plurality of peaks correspond to locations where the laser or the electron beam has not directly impinged the electrode or has impinged the electrode with a power that is reduced or modulated;

the at least one laser deposition layer with the lattice or grid-like pattern has an interlayer surface area that is greater than or equal to 1.8× a surface area of the same layer if the same layer was perfectly flat;

the thermally resilient joint creates both a mechanical lock and a metallurgical bond between the electrode tip and the electrode base;

at least ⅕ (20%) of a total volume of precious metal-based material from the thermally resilient joint and the electrode tip is embedded or sunken into the electrode base;

the electrode base includes one or more lobe(s), when viewed in cross-section, and the electrode tip is built around the lobe(s) of the electrode base so that the mechanical lock includes the thermally resilient joint located between the electrode base and the electrode tip;

the electrode base includes one or more columns(s), when viewed in cross-section, and the electrode tip is built around the column(s) of the electrode base so that the mechanical lock includes the thermally resilient joint located between the electrode base and the electrode tip;

the plurality of laser deposition layers are made by additive manufacturing, which uses a powder bed fusion technique to melt or sinter powder onto the electrode base with a laser or electron beam, and then to allow the melted or sintered powder to solidify to become the thermally resilient joint and the electrode tip; and/or the precious metal-based material is an iridium-based material or a platinum-based material.

According to another embodiment, there is provided an additive manufacturing process for manufacturing a spark plug electrode, comprising the steps of: providing an electrode base; providing powder that includes a precious metal-based material; positioning the electrode base in a tool and covering an end surface of the electrode base with the powder; directing a laser or an electron beam at the end surface of the electrode base such that it melts or sinters at least some of the powder and forms a thermally resilient joint on the electrode base; covering an end surface of the thermally resilient joint with the powder; and directing the laser or the electron beam at the end surface of the thermally resilient joint such that it melts or sinters at least some of the powder and forms an electrode tip on the thermally resilient joint.

DRAWINGS

Preferred embodiments will hereinafter be described in conjunction with the appended drawings, wherein like designations denote like elements, and wherein.

DESCRIPTION

The spark plug electrode disclosed herein includes an electrode tip that is formed on an electrode base using an additive manufacturing process, such as a powder bed fusion technique. Some non-limiting examples of potential powder bed fusion techniques include: selective laser melting (SLM), selective laser sintering (SLS), direct metal laser sintering (DMLS), and electron beam melting (EBM).

By way of example, the electrode base may be made of a nickel-based material, while the electrode tip may be made of a precious metal-based material, such as those having iridium, platinum, palladium, ruthenium, etc. The precious metal-based material is selected to improve the resistance of the spark plug electrode to corrosion and/or electrical erosion. By using an additive manufacturing process to build the electrode tip on the electrode base, a spark plug electrode with a thermally resilient joint between the electrode base and tip can be formed. Those skilled in the art will appreciate that when a precious metal-based electrode tip is joined to a nickel-based electrode base, such as by laser welding, there is typically a substantial amount of thermal and/or other stresses on the joint during operation due to the different properties of the materials (e.g., different coefficients of thermal expansion, different melting temperatures, etc.). These stresses, in turn, can undesirably lead to cracking or other damage to the electrode base, the electrode tip, the joint connecting the two components, or a combination thereof. Furthermore, these challenges are exacerbated in an internal combustion engine, where a spark plug electrode is subjected to harsh conditions and extreme temperature and/or load changes. The spark plug electrode described herein, with its thermally resilient joint that attaches the electrode tip to the electrode base and is formed by additive manufacturing, is designed to address these challenges.

The present spark plug electrode is designed for use in a wide variety of spark plugs and other ignition devices including automotive spark plugs, industrial spark plugs, aviation igniters, glow plugs, prechamber plugs, or any other device that is used to ignite an air/fuel mixture in an engine. This includes, but is certainly not limited to, the exemplary automotive spark plugs that are shown in the drawings and are described below. Furthermore, it should be noted that the present spark plug electrode may be used as a center and/or ground electrode. Other embodiments and applications of the spark plug electrode are also possible. Unless otherwise specified, all percentages provided herein are in terms of weight percentage (wt %) and all references to axial, radial and circumferential directions are based on the center or longitudinal axis A of the spark plug.

Figures 1, 2, 3, 4:
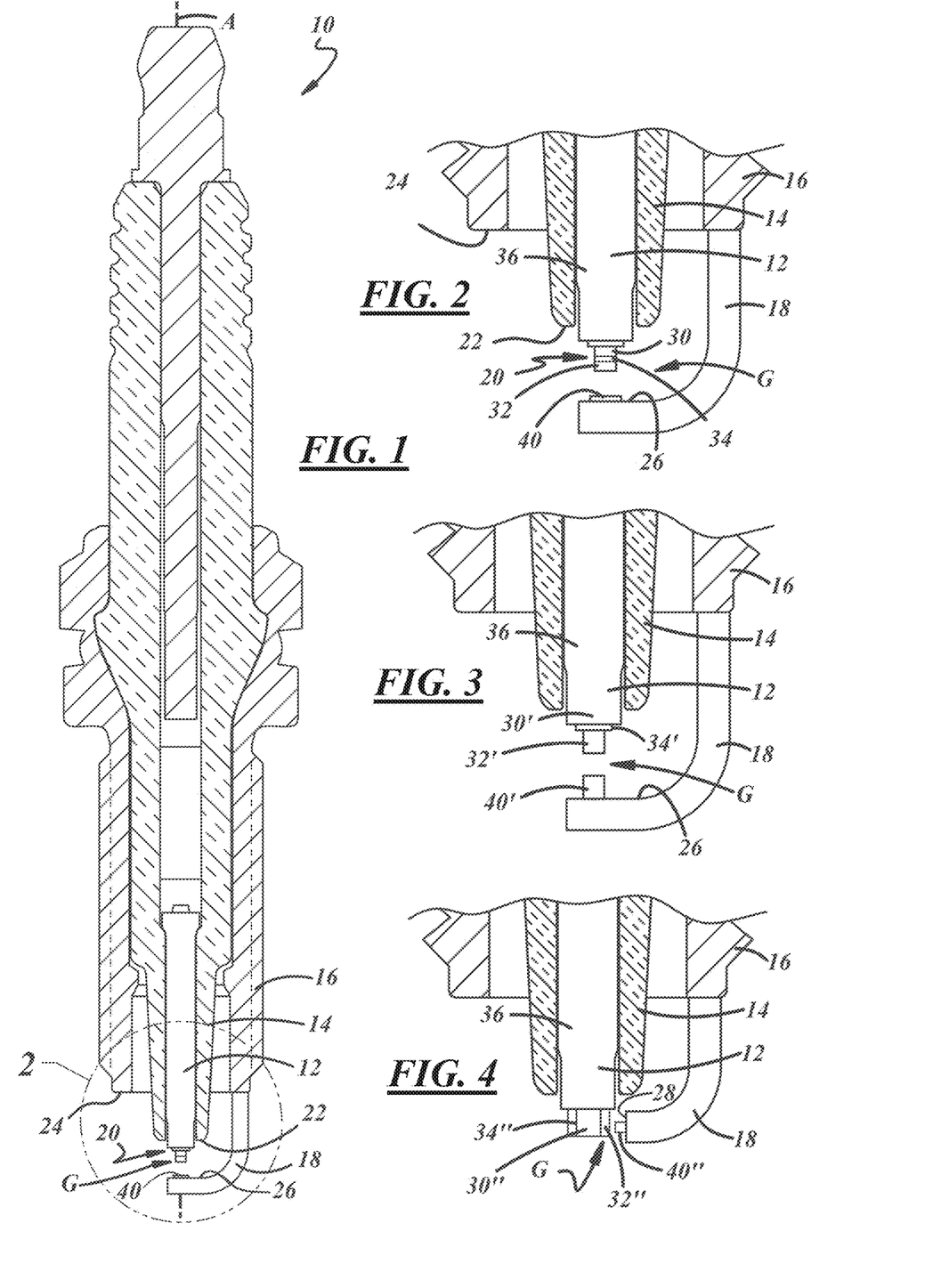
FIG. 1 is a cross-sectional view of a spark plug.
FIG. 2 is a cross-sectional view of the firing end of the spark plug in FIG. 1, where the firing end has an electrode tip that is built onto an electrode base via an additive manufacturing process.
FIGS. 3 and 4 are cross-sectional views of other examples of firing ends of spark plugs, where the firing ends have electrode tips that are built onto electrode bases via additive manufacturing processes.

Referring to FIGS. 1 and 2, there is shown an exemplary spark plug 10 that includes a center electrode 12, an insulator 14, a metallic shell 16, and a ground electrode 18. The center electrode 12 is disposed within an axial bore of the insulator 14 and includes a firing end 20 that protrudes beyond a free end 22 of the insulator 14. As explained below in more detail, the firing end 20 may include an electrode base 30 made from a nickel-based material and an electrode tip 32 made from a precious metal-based material, where the electrode tip is formed on the electrode base with an additive manufacturing process so that a thermally resilient joint 34 is created therebetween. Insulator 14 is disposed within an axial bore of the metallic shell 16 and is constructed from a material, such as a ceramic material, that is sufficient to electrically insulate the center electrode 12 from the metallic shell 16. The free end 22 of the insulator 14 may protrude beyond a free end 24 of the metallic shell 16, as shown, or it may be retracted within the metallic shell 16. The ground electrode 18 may be constructed according to the conventional J-gap configuration shown in the drawings or according to some other arrangement, and is attached to the free end 24 of the metallic shell 16. According to this particular embodiment, the ground electrode 18 includes a side surface 26 that opposes the firing end 20 of the center electrode and has an electrode tip 40 that may or may not be formed according to an additive manufacturing process. The electrode tip 40 is in the form of a flat pad and defines a spark gap G with the electrode tip 32 of the center electrode such that they provide sparking surfaces for the emission, reception, and exchange of electrons across the spark gap G. The electrode tips 32 and 40 may be formed from the same precious metal-based material or they may be formed from different precious metal-based materials.

In the example shown in FIGS. 1 and 2, the electrode base 30 is a diametrically reduced extension of and is made from the same nickel-based material as the main electrode body 36. The electrode base 30 is a unitary component or part of the main electrode body 36 and has been machined, drawn down, or otherwise manufactured so that it has a smaller diameter than that of the adjacent electrode body 36 and, thus, provides a pedestal or surface upon which the electrode tip 32 can be built. It is also possible, however, for the electrode base 30 to be a separate component that is welded, formed by additive manufacturing, or otherwise attached to the axial or distal end of the main electrode body 36; in such an example, the electrode base 30 and main electrode body 36 can be made from the same or different materials. As will be explained more thoroughly, an additive manufacturing process may be used to form the electrode tip 32 directly on the electrode base 30 by selectively directing a laser or electron beam at a bed of precious metal-based powder that is brought into contact with the electrode base. This causes the precious metal-based powder, as well as portions of the nickel-based material of the electrode base 30, to melt together and then solidify into an electrode tip layer. The additive manufacturing process is then repeated so that the electrode tip 32 is built up, one layer at a time, on the electrode base 30. The first one or more layer(s) that include both precious metal-based material and nickel-based material make up the thermally resilient joint 34 and can have a significant impact on the bonding strength of the electrode tip 32 to the electrode base 30. Once a sufficient number of electrode tip layers have been formed, the electrode tip 32 will reach its desired axial height.

As mentioned above, the present spark plug electrode is not limited to the exemplary configuration shown in FIGS. 1 and 2, as it may be employed in any number of different applications, including automotive spark plugs, industrial spark plugs, aviation igniters, glow plugs, prechamber plugs, or other devices. Some non-limiting examples of other potential applications where the present spark plug electrode could be used are illustrated in FIGS. 3 and 4, where similar reference numerals as FIGS. 1 and 2 denote similar features. Other embodiments and examples, such as various types of spark plugs with different axial, radial and/or semi-creeping spark gaps, as well as multiple center and/or ground electrodes, are certainly possible.

In FIG. 3, the electrode base 30' is simply the lower or axial end of the main electrode body 36 and is not a machined, drawn down or otherwise diametrically reduced extension of the adjacent electrode body. In this example, the electrode tip 32' is simply built or formed onto the axial end of the main electrode body 36, which is the electrode base 30', and may be manufactured using a bed of precious metal-based powder and the additive manufacturing process described herein. The drawings show the electrode tip 32' being somewhat diametrically smaller than the corresponding electrode base 30', but this is not necessary, as the electrode tip 32' could be formed with the same diameter as the electrode base 30' so that the whole firing end area of the center electrode 12 has a uniform diameter. The connection or attachment area between the electrode base 30' and the electrode tip 32' is the thermally resilient joint 34'. An electrode tip 40', which is optional and is preferably made of a precious metal-based material, can be formed by additive manufacturing or it can be welded onto the side surface 26 of the ground electrode 18 to define a spark gap G with the electrode tip 32'. The electrode tips 32' and 40' may be formed from the same precious metal-based material or they may be formed from different precious metal-based materials.

Turning to FIG. 4, the electrode base 30" extends from the main electrode body 36 and may be an integral extension of the electrode body or it may be a separate component that has been welded, additive manufactured or otherwise attached to the end of the electrode body. In this example, the electrode tip 32" is an annular ring that is formed around the outer circumferential side of the electrode base 30", as opposed to being formed on its axial end, and is made of a precious metal-based material. The electrode tip 32" may have an outer diameter that is equal to, less than or greater than that of the corresponding main electrode body 36. An additive manufacturing process, such as a powder bed fusion process, may be utilized to form the electrode tip 32" around the outer circumference of the electrode base 30", one annular layer at a time, so that a thermally resilient joint 34" is created between the electrode base and tip. An optional electrode tip 40" can be attached to a ground electrode 18 so as to define a spark gap G with the electrode tip 32". In this example, the electrode tip 40" is made of a precious metal-based material and is attached to an axial end surface 28, as opposed to a side surface, of the ground electrode 18 via welding or additive manufacturing. The electrode tips 32" and 40" may be formed from the same precious metal-based material or they may be formed from different precious metal-based materials. It is also possible for the spark plug of FIG. 4 to have more than one ground electrode 18 and/or electrode tips 40", to cite a few possibilities.

The term "electrode base," as it is used herein, means the section or portion of the electrode on which the electrode tip is formed by additive manufacturing. The electrode base may include embodiments that: are diametrically reduced with respect to a main electrode body, as well as those that are not; are an integral part or extension of a main electrode body, as well as those that are a separate component; are located at an axial end of a main electrode body, as well as those that are located on a side surface or other part of the electrode; are part of a center electrode or a ground electrode; have a thermal or heat conducting core (e.g., a copper-based core), as well as ones that do not; or are made from the same material as a main electrode body, as well as those that are made from another material, to cite but a few possibilities. Non-limiting examples of possible electrode bases include electrode base 30, 30' and 30".

Similarly, the term "electrode tip," as it is used herein, means the section or portion of the electrode, usually the sparking portion, that is formed on the electrode base by additive manufacturing. The electrode tip may include embodiments that: are diametrically reduced with respect to an electrode base, as well as those that are not; are in the shape of rivets, cylinders, bars, columns, wires, balls, mounds, cones, flat pads, disks, rings, sleeves, etc.; are located at an axial end of an electrode base, as well as those that are located on a side surface or other part of the electrode base; are part of a center electrode or a ground electrode; are made from a precious metal-based material (e.g., materials that have iridium, platinum, palladium, ruthenium, etc.), as well as those that are made from another material; and have additional stress relieving layer(s) between the electrode base and tip, as well as ones that do not, to cite but a few possibilities. Non-limiting examples of possible electrode tips include electrode tip 32, 40, 32' 40', 32" and 40".

Figure 5:
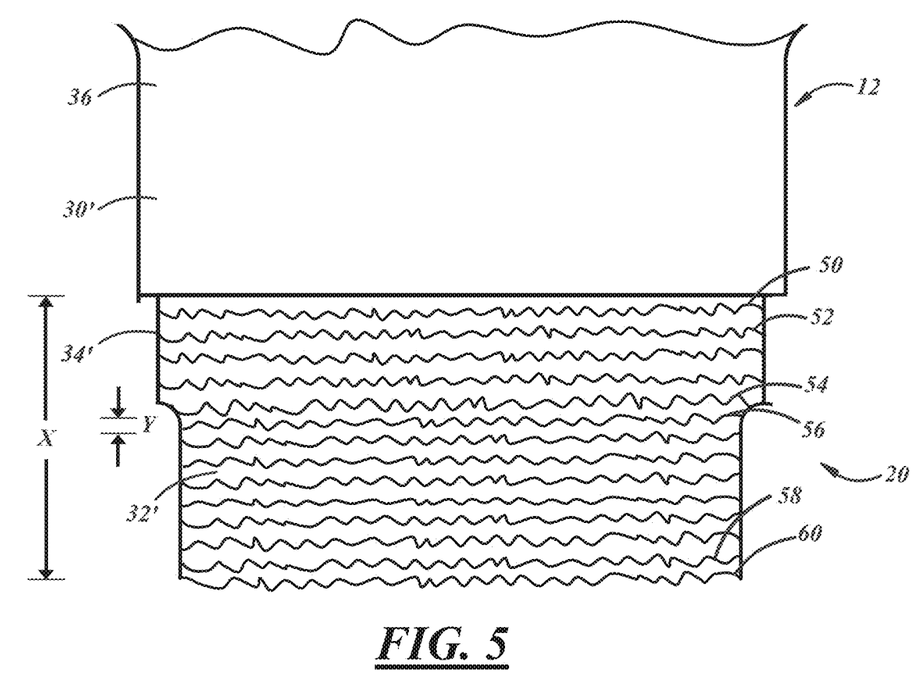
FIG. 5 is an enlarged schematic view of the center electrode of the firing end in FIG. 3, where the center electrode has an electrode tip that is built onto an electrode base via an additive manufacturing process and includes a number of laser deposition layers.
Figure 6:
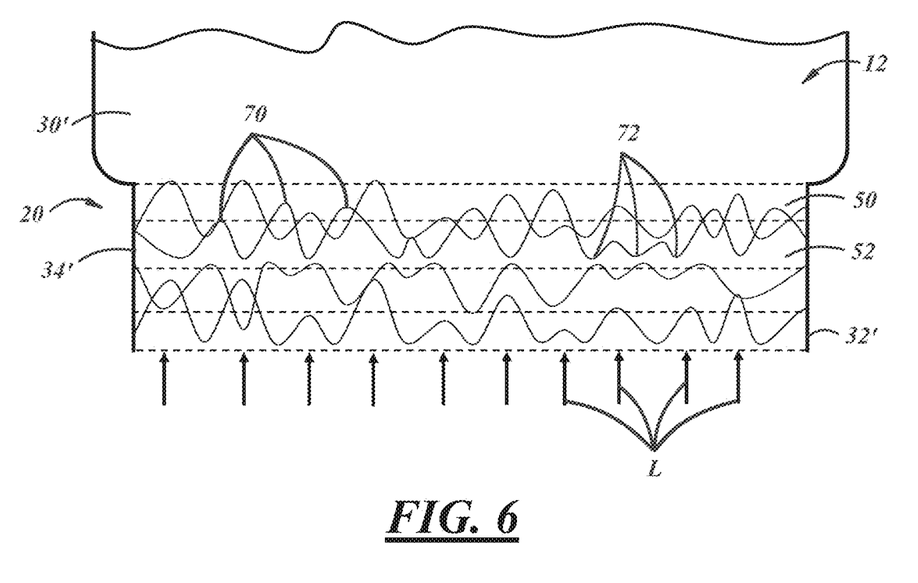
FIG. 6 is an enlarged schematic view of the center electrode in FIG. 5, where a laser deposition layer is shown from the side being formed via an additive manufacturing process.
Figure 7:
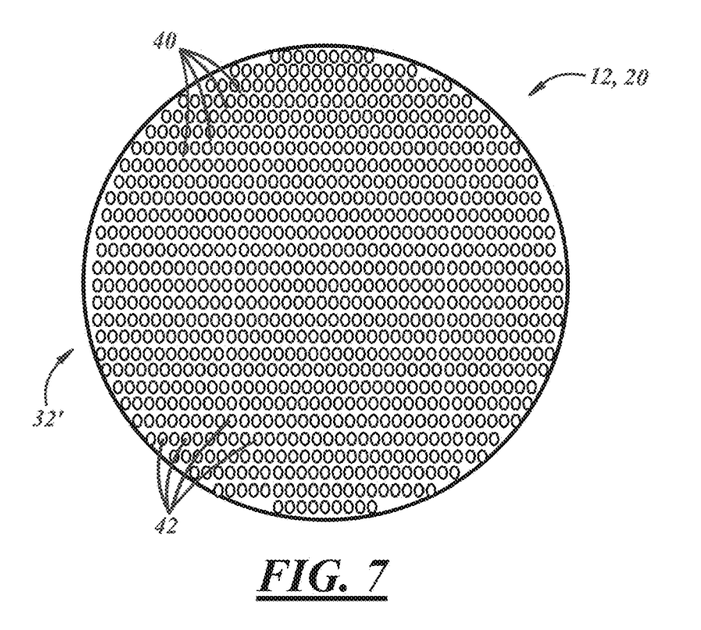
FIG. 7 is an enlarged schematic view of the center electrode in FIG. 5, where a laser deposition layer is shown from the end being formed via an additive manufacturing process.

Turning now to FIGS. 5-7, there are shown several enlarged schematic illustrations of the center electrode firing end from FIG. 3. Center electrode 12 has a firing end 20 that includes an electrode base 30', an electrode tip 32', and a thermally resilient joint 34' that connects or attaches the electrode tip to the electrode base. It should be appreciated that the following descriptions of the electrode base, the electrode tip, and the thermally resilient joint are not limited to the center electrode shown in FIG. 3 and are also applicable to other center electrode and/or ground electrode embodiments.

Electrode base 30, 30', 30" is the section or portion of the center electrode 12 on which the electrode tip is formed by additive manufacturing and, thus, acts as a carrier material for the electrode tip. As mentioned above, the electrode base 30, 30', 30" may be an integral extension of a main electrode body 36 or it may be a separate piece or component that is welded, additive manufactured, or otherwise attached to the main electrode body. If the electrode base 30, 30', 30" is an integral extension of or has been welded to the main electrode body 36, then it is likely that the electrode base was manufactured by drawing, extruding, machining, and/or some other conventional process. If, on the other hand, the electrode base 30, 30', 30" was additive manufactured on the main electrode body 36, then the electrode base would have been created from a laser melted or sintered powder bed, in much the same way that the electrode tip is formed on the electrode base. In either case, it is usually preferable for the electrode base 30, 30', 30" to be made from a nickel-based material. The term "nickel-based material," as used herein, means a material in which nickel is the single largest constituent of the material by weight, and it may or may not contain other constituents (e.g., a nickel-based material can be pure nickel, nickel with some impurities, or a nickel-based alloy). According to one example, the electrode base 30, 30', 30" is made from a nickel-based material having a relatively high weight percentage of nickel, such as a nickel-based material comprising 98 wt % or more nickel. In a different example, the electrode base is made from a nickel-based material having a lower weight percentage of nickel, like a nickel-based material comprising 50-90 wt % nickel (e.g., INCONEL™ 600 or 601). One particularly suitable nickel-based material has about 75-80 wt % nickel, 10-20 wt % chromium, and 5-10 wt % iron. For nickel-based materials, the electrode base 30, 30', 30" may have a coefficient of thermal expansion between $12 \times 10^{-6}$ m/mK and $15 \times 10^{-6}$ m/mK and a melting temperature between 1,200° C. and 1,600° C. The diameter or size of the electrode base 30, 30', 30" can vary substantially depending on the particular application and embodiment (e.g., the diameter of electrode base 30, which is part of the center electrode, is likely smaller than that of an electrode base for electrode tip 40, which is part of the ground electrode). According to the non-limiting example shown in FIG. 2, where the electrode base 30 is a narrowed down extension of center electrode 12, the electrode base may have a diameter between 0.4 mm and 1.0 mm, inclusive, and even more preferably between 0.5 mm and 0.9 mm, inclusive. In the example of FIG. 3, where the electrode base 30' constitutes the lower axial end of the center electrode 12, the electrode base may have a diameter between 1.4 mm and 3.2 mm, inclusive, and even more preferably between 2.0 mm and 3.0 mm, inclusive. In terms of the FIG. 4 example, where the electrode base 30" is a narrowed down extension of center electrode 12 and is designed to receive an annular shaped electrode tip 32", the electrode base may have a diameter between 0.2 mm and 0.8 mm, inclusive, and even more preferably between 0.2 mm and 0.6 mm, inclusive. Other materials, including those that are not nickel-based, and other sizes and shapes may be used for the electrode base 30, 30', 30" instead.

Electrode tip 32, 32', 32" is the section or portion of the electrode, usually the sparking portion, that is formed on the electrode base by additive manufacturing. As such, the electrode tip 32, 32', 32" may be made from a bed of precious metal-based powder that is brought into close proximity with the electrode base so that, when irradiated by a laser or electron beam, the precious metal-based powder and some of the solid material of the electrode base are melted and then solidify into an initial laser deposition layer 50. This process of creating individual layers is repeated, thereby creating a number of laser deposition layers 50-60 that are sequentially built or stacked on one another. Each laser deposition layer has an average layer thickness Y, which may be between 20 and 60 µm, and the total or sum of all of the layer thicknesses is the electrode tip height X, which may be between 0.1 and 1.0 mm, or even more preferably between 0.1 and 0.6 mm. The electrode tip 32, 32', 32" may be made from a precious metal-based material so as to provide improved resistance to corrosion and/or erosion. The term "precious metal-based material," as used herein, means a material in which a precious metal is the single largest constituent of the material by weight, and it may or may not contain other constituents (e.g., a precious metal-based material can be pure precious metal, precious metal with some impurities, or a precious metal-based alloy). Precious metal-based materials that may be used include iridium-, platinum-, ruthenium- and/or palladium-based materials, to cite a few possibilities. According to one example, the electrode tip 32, 32', 32" is made from an iridium- or platinum-based material, where the material has been processed into a powder form. For iridium-based materials, the electrode tip may have a coefficient of thermal expansion between $6 \times 10^{-6}$ m/mK and $7 \times 10^{-6}$ m/mK and a melting temperature between 2,400° C. and 2,500° C.; for platinum-based materials, the electrode tip may have a coefficient of thermal expansion of between $8 \times 10^{-6}$ m/mK and $10 \times 10^{-6}$ m/mK and a melting temperature between 1,700° C. and 1,800° C. The diameter or size of the electrode tip 32, 32', 32" varies depending on the particular application and embodiment. For instance, in the non-limiting example shown in FIG. 2, where the electrode tip 32 extends from the electrode base 30 and is generally the same size, the electrode tip may have a diameter between 0.4 mm and 1.0 mm, inclusive, and even more preferably between 0.5 mm and 0.9 mm, inclusive. In the example of FIG. 3, the electrode tip 32' may have a diameter between 0.4 mm and 3.2 mm, inclusive, and even more preferably about 0.6 mm to 2.5 mm, inclusive. In terms of the FIG. 4 example, where the electrode tip 32" is an annular sleeve that fits around electrode base 30", the electrode tip may have an outer diameter between 0.4 mm and 1.0 mm, inclusive, and even more preferably between 0.6 mm and 1.0 mm, inclusive. Other materials, including those that are not precious metal-based, and other sizes and shapes may be used for the electrode tip 32, 32', 32" instead.

Thermally resilient joint 34, 34', 34" is located between the electrode base and the electrode tip and is a transitional section or portion of the electrode that includes material from both the electrode base and the electrode tip. The thermally resilient joint 34, 34', 34" is designed to reduce, mitigate, offset and/or address the thermal stresses that arise between those two components when the spark plug is in operation, thereby improving the attachment of the electrode tip to the electrode base. As stated above, the thermal properties or characteristics of the electrode base and the electrode tip, such as their coefficients of thermal expansion, differ from one another; sometimes, to a substantial degree. When the spark plug is in operation, the temperatures seen at the firing end can reach extremely high levels, which conventionally results in the different metals expanding and contracting at different rates and exerts a significant amount of stress on the weld that attaches the tip to the base. The thermally resilient joint 34, 34', 34", with its stacked layers, is manufactured in such a way that thermally induced stresses are minimized or at least reduced, thereby improving the durability of the spark plug and increasing its service life. The present electrode may achieve these goals, at least partially, through the use of several features: a tailored composition gradient and/or increased inter-layer surface areas. These features are best explained in conjunction with FIGS. 5-10, which use the non-limiting example of the center electrode in FIG. 3 as a basis of discussion. It should be appreciated that the following description applies to the other electrode embodiments as well (i.e., FIGS. 1, 2, 4 and ground electrodes) and is not limited to the example of FIG. 3.

Figure 8:
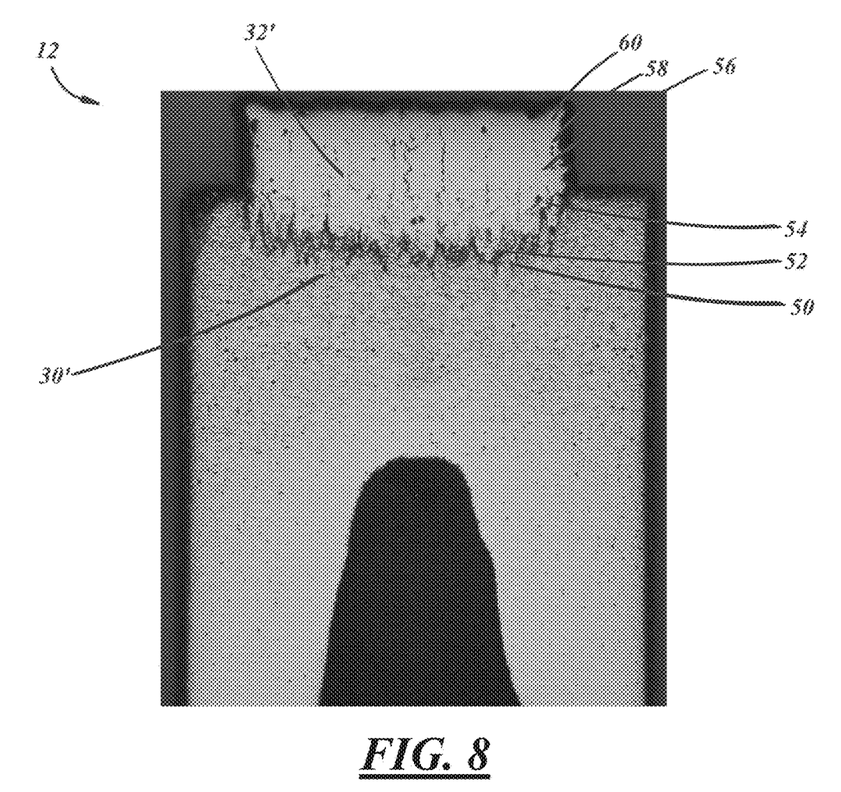
FIG. 8 is an enlarged micrograph of the center electrode of the firing end in FIG. 3, where the center electrode has an electrode tip that is built onto an electrode base via an additive manufacturing process and includes a number of laser deposition layers.

Turning to FIGS. 5-7, there are shown enlarged illustrations of the firing end 20 of the center electrode 12, where the electrode tip 32' is formed on the electrode base 30' via the thermally resilient joint 34'. It should be appreciated that these drawings are only schematic illustrations, as the different laser deposition layers 50-60 will not likely be perfectly discrete flat layers, as illustrated with dashed lines. A micrograph is provided in FIG. 8 that more accurately captures an actual cross-sectional structure of the electrode, where the different laser deposition layers are more jagged or serrated than flat, and are more blended into one another as opposed to being separate or discrete. In order to form the initial laser deposition layer 50, the main electrode body 36 can be inserted into a jig or other tool 100 that maintains it in a vertical orientation, with the firing end 20 facing upwards (see FIGS. 13 and 14). A bed of powder 102 that includes precious metal-based material can then be placed over the electrode base 30' such that a thin layer of precious metal-based powder covers the axial or distal end of the electrode base. Once the powder bed is in place, a laser or electron beam can be used to melt or at least sinter the thin powder layer that is over top of the electrode base 30', along with a certain amount of the electrode base itself; this is the powder bed fusion process. When the combination of the melted powder (precious metal-based material) and the electrode base 30' (nickel-based material) solidifies, it forms the initial laser deposition layer 50. This process is then repeated a number of times to then form the subsequent laser deposition layers 52-60. The first several layers that are formed (e.g., laser deposition layers 50, 52, etc.) may include material from both the electrode base 30' and the electrode tip 32'; these dual-material layers constitute the thermally resilient joint 34'. The final laser deposition layer 60 that is formed may act as a sparking surface. In some examples, the thermally resilient joint 34' is comprised of 50% or more precious metal (i.e., of the total material, both nickel- and precious metal-based material, that makes up the thermally resilient joint 34', at least 50% is precious metal), particularly at the last dual-material layer of the thermally resilient joint which is adjacent to the electrode tip. At one point, the laser deposition layers only include material from the powder bed (i.e., the precious metal-based material); these layers constitute the electrode tip 32' and can be comprised of 95% or more precious metal. As shown in FIG. 8, the additive manufacturing process is able to embed all or most of the thermally resilient joint (includes laser deposition layers 50, 52, etc. that have both electrode base and electrode tip material) into the electrode base such that at least $\frac{1}{5}$ (20%) of the total volume of precious metal-based material (i.e., total volume of precious metal-based material from both the thermally resilient joint and the electrode tip) is embedded or sunken into the electrode base.

Since each laser deposition layer 50-60 is formed first by melting or sintering powder from a powder bed 102 and then allowing the material to solidify, it is possible to adjust or modify the composition of the different laser deposition layers by changing the composition of the powder bed 102. This enables the present electrode to have a tailored or customized composition gradient across the thermally resilient joint 34' and/or the electrode tip 32'. For example, in order to minimize the difference in the coefficients of thermal expansion from the electrode base 30' to the thermally resilient joint 34', the initial laser deposition layer 50 may be made from a powder bed that includes 50% nickel-based material and 50% precious metal-based material, whereas the next laser deposition layer 52 may be made from powder that has the same composition or one with more precious metal-based material. As each laser deposition layer is formed, and is thus further away from the electrode base 30', the relative percentage of nickel-based material may decrease while the relative amount of precious metal-based material may increase. At the final laser deposition layer 60, a powder bed that includes only precious metal-based material may be used, as that material is preferable for a sparking surface. This creates a tailored composition gradient across the thermally resilient joint 34' and/or the electrode tip 32' that spreads out the differences in thermal coefficients of expansion across a number of inter-layer boundaries, as opposed to having the full difference of those coefficients experienced at a single inter-layer boundary. In the past, in order to achieve a tailored composition gradient like this, one would typically have to weld small slices or layers of the electrode tip on top of one another, which is very tedious and costly and can have the undesirable effect of creating numerous weld joints that can fail. With the present electrode, a tailored composition gradient can be achieved through additive manufacturing by selectively building layers on top of each other such that they all blend into an integrated electrode assembly with a composition that continuously increases, in terms of the relative amount of precious metal-based material, as one moves from the electrode base 30' to the end of the electrode tip 32'. If changing the composition of the powder bed 102 between layers proves to be too burdensome or time consuming, it is possible to use the same powder composition for a certain number or group of layers (e.g., a 50% nickel-based material, 50% precious metal-based material blend for the first 5 layers), then change the powder composition for a certain number or group of layers (e.g., a 25% nickel-based material, 75% precious metal-based material blend for the next 5 layers), and then complete the electrode tip 32' with a final powder composition for a certain number or group of remaining layers (e.g., a 100% precious metal-based material blend for the final 5 layers). Of course, this is only an example, as many other embodiments are certainly possible. It is also preferable that the thermally resilient joint 34' have a fine grain structure in the predominant volume of the structure.

In order to achieve increased inter-layer surface areas, a lattice or grid-like pattern may be used during the additive manufacturing process. To illustrate, consider the schematic illustrations in FIG. 6, which shows the first four or so laser deposition layers of the thermally resilient joint 34' being formed, where each layer has a series of valleys 70 and peaks 72. For purposes of consistency, the center electrode 12 in FIGS. 5 and 6 has been drawn in the same orientation as shown in FIGS. 1-4. However, during manufacture, the center electrode 12 would likely be inverted so that the firing end 20 and electrode base 30' would be facing upwards (see FIG. 14) so that a thin bed of powder could be placed on top of the axial or distal end surface of the center electrode, thereby covering it up. The series of valleys 70 correspond to those areas where a laser L has impinged or struck the end of the electrode, through the thin powder bed, and created a pit or indentation of some type. The series of peaks 72, on the other hand, correspond to those sections of electrode that were not directly struck by the laser or were struck by a laser where power was reduced or modulated so that a protrusion or peak has been left in place. The valleys 70 and/or peaks 72 may be conical in shape. Since the surface of each layer is not flat or planar, as the case with traditional electrodes where a disc- or plate-shaped tip is discretely welded onto the electrode, the inter-layer surface area of each laser deposition layer 50-60 is larger. Put differently, the surface area of a layer that has numerous peaks and valleys is larger than the corresponding surface area of the same layer if it was perfectly flat. Thus, at least one of the laser deposition layers may have a surface area that is greater than or equal to 1.8× a surface area of the same layer if the same layer was perfectly flat (i.e., the layer with the lattice or grid-like structure of peaks and valleys has a surface area that is at least 1.8× larger than that of the same layer if the same layer with the same dimensions was perfectly flat or planar). A potential method for determining the surface area of a laser deposition layer includes the following steps: using an aqua regia technique to remove the precious metal-based material from the initial laser deposition layer in the thermally resilient joint in order to expose the nickel-based material of the underlying electrode base, which includes the valleys and peaks mentioned above; from the exposed surface, using a laser microscope to create a height profile; from the heigh profile, using a CAD system to calculate the surface area of the laser deposition layer; and comparing the calculated surface area to a surface area of the same shape and size, assuming that it was perfectly flat. The average inter-layer surface area across the thermally resilient joint 34' is the average of the various surface areas of the different laser deposition layers at the different inter-layer interfaces or boundaries (e.g., the average of: the surface area of layer 50 at the inter-layer interface 50/52, the surface area of layer 52 at the inter-layer interface 52/next layer, and so on throughout the thermally resilient joint 34'). In one example, the average inter-layer surface area throughout the thermally resilient joint 34' is greater than or equal to 1.8× the surface area of the electrode base 30', before the tip was formed, if the electrode base was perfectly flat and had the same dimensions as the thermally resilient joint 34'.

This increased inter-layer surface area, which is created by the laser L following a lattice or grid-like pattern across the end of the electrode during additive manufacturing (see FIG. 7), may be beneficial for several reasons. First, the valleys and peaks 70, 72 create a network of undulations that helps metallurgically and/or mechanically lock the different layers together in a more comprehensive way than if they were discrete, flat pieces welded to one another. Second, the increased inter-layer surface area, with the valleys and peaks extending from one layer into one or more adjacent layer(s), creates a more integrated structure with improved thermal conductivity. Thus, heat generated near the outermost laser deposition layer 60 (sparking surface) can be more effectively conveyed to the electrode base 30' and ultimately away from the firing end 20. Third, the multi-layer structure of the present electrode, with its increased inter-layer surface area appears to reduce cracking and/or inhibits crack growth in the electrode tip 32'. The preceding benefits are simply examples of some of the qualities that the present electrode may enjoy, but they are not mandatory nor are they a complete or exhaustive list of all of the benefits.

Figure 9:
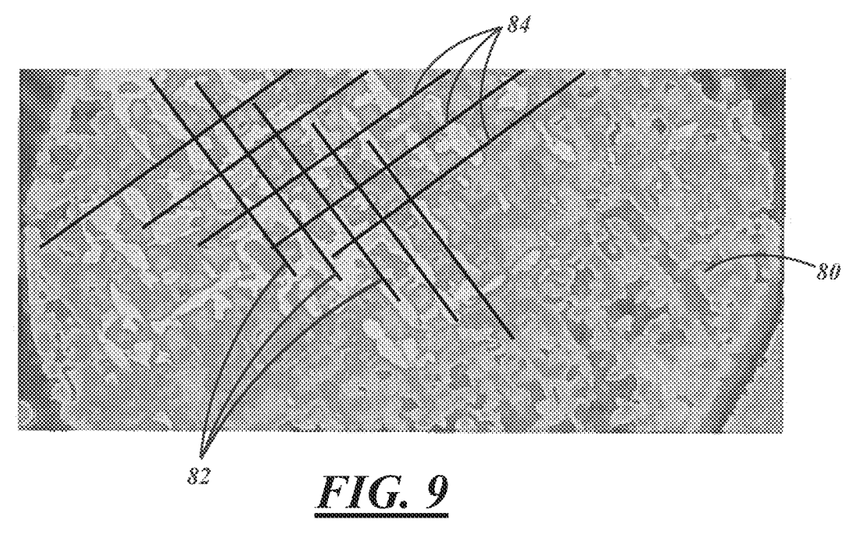
FIGS. 9 and 10 are enlarged micrographs of examples of laser deposition layers.
Figure 10:
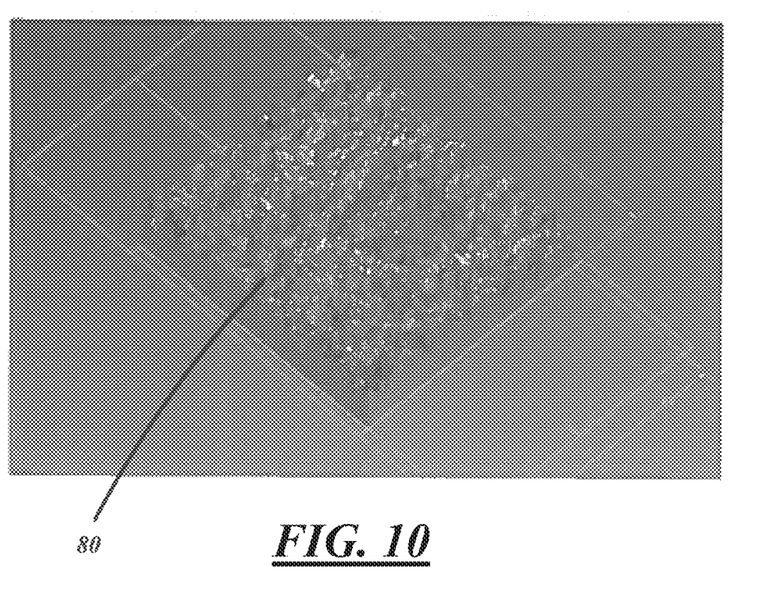

FIG. 9 shows an exposed laser deposition layer, such as the final laser deposition layer 60, having a lattice or grid-like pattern 80 formed thereon. According to this example, the laser that is used to form the laser deposition layers 50-60 is first moved across the electrode in a series of rows 82, where every so often the laser is fired to create a valley 70 at that location. Then the laser is moved or directed across the electrode in a series of columns 84, that are generally perpendicular to the rows 82, where again every so often the laser is fired to create a valley 70. The combination of these rows and columns, with the various valleys 70 and peaks 72, creates a lattice or grid-like pattern 80 that is shown in FIGS. 9 and 10. According to a non-limiting example, each laser impinged valley 70, at its deepest point during the additive manufacturing process, is approximately 0.3 mm-0.5 mm deep, and is spaced about 0.05 mm-0.10 mm from the closest adjacent valley. Of course, once the laser deposition layer is formed and solidified, some of the laser impinge valley 70 may have filled in with nearby material so that it is not as deep as the aforementioned range. In one example, the final laser deposition layer 60, which is the furthest layer away from the electrode base 30', has the lattice or grid-like pattern 80 and acts a sparking surface for the spark plug electrode. In general, the electrode tip height X may be between 0.1 mm and 1.0 mm. For those examples where the present electrode is a center electrode 12, the electrode tip height X may be between 0.2 mm and 1.0 mm. For those examples where the present electrode is a ground electrode 18, the electrode tip height may be between 0.1 mm and 0.5 mm.

Figure 11:
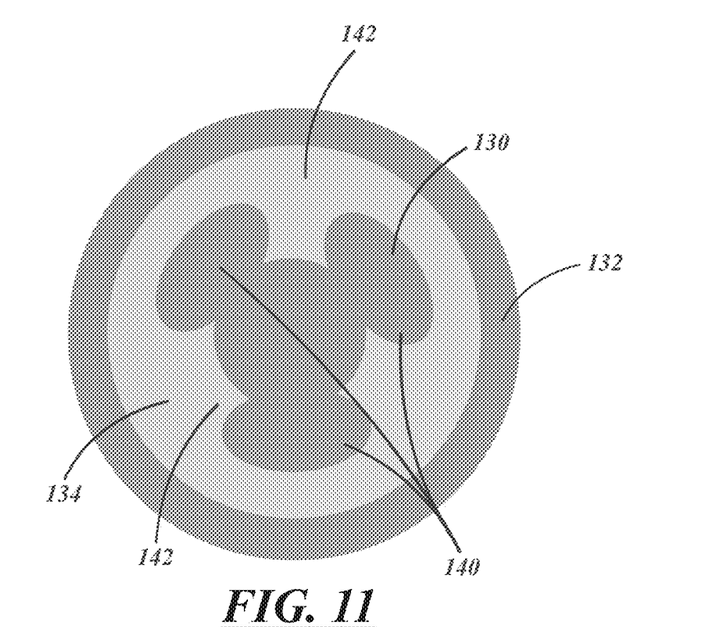
FIGS. 11 and 12 are enlarged schematic views of other examples of electrodes, where the electrodes have electrode tips that are built onto electrode bases via additive manufacturing processes.
Figure 12:
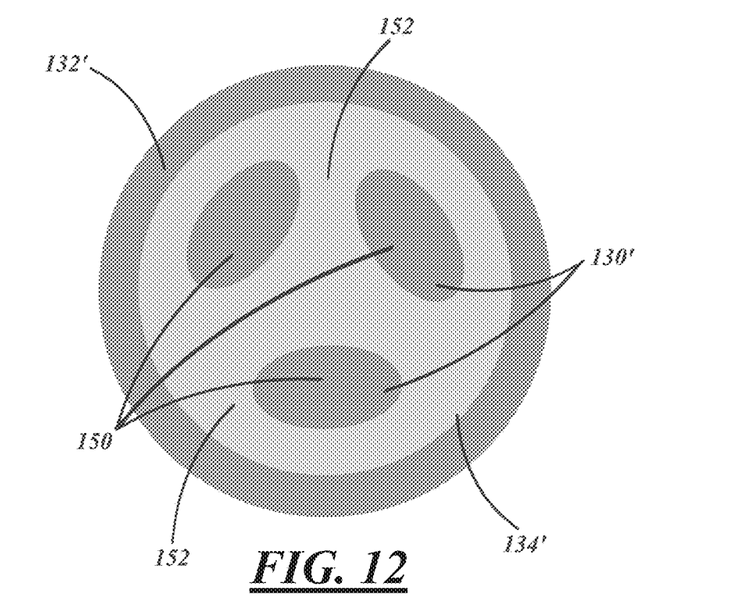

Turning now to FIGS. 11 and 12, there are shown several other embodiments of a spark plug electrode with an electrode base 130, 130', an electrode tip 132, 132', and a thermally resilient joint 134, 134', only this embodiment is of an exemplary electrode where the electrode base has a cross-sectional configuration that is designed to create a substantial mechanical lock with the electrode tip that is built around it. The electrodes in FIGS. 11 and 12 could either be a center electrode (in which case, the electrode base 130, 130' could be an axial extension of a main electrode body), a ground electrode (in which case, the electrode base 130, 130' could extend from a side surface of the ground electrode), or some other electrode configuration (e.g., part of an annular ground electrode the circumferentially surrounds a center electrode). In the example of FIG. 11, the electrode base 130 is preferably made of a nickel-based material that axially extends from an end of a main electrode body (not shown) and is somewhat clover-shaped, when viewed in cross-section. The three lobes 140 of the clover-shaped design provide a locking structure so that when the electrode tip 132 and/or the thermally resilient joint 134 is built around the electrode base 130 by additive manufacturing, a substantial mechanical interlock 142, in addition to a metallurgical bond, can be established. As with the previous embodiments, the electrode tip 132 is preferably made of a precious metal-based material and the thermally resilient joint 134 includes both precious metal-based material and nickel-based material, as it is radially located between the electrode base and the electrode tip.

In the example of FIG. 12, the electrode base 130' includes several separate columns 150 that axially extend from an end of a center electrode and are preferably made of a suitable, nickel-based material. A thermally resilient joint 134' is built by additive manufacturing so that it surrounds the separate columns 150 and creates a mechanical interlock 152 that helps maintain the different electrode components in place. Finally, an electrode tip 132' is built by additive manufacturing so that it circumferentially surrounds and is securely connected to the thermally resilient joint 134'. In each of these embodiments, the electrode tip 132, 132' and/or the thermally resilient joint 134, 134' may include a number of laser deposition layers, as explained above in more detail. The orientation of the laser deposition layers may be such that they stack up in the axial direction, as was the case with the examples of FIGS. 5-6, or they are built out in the radial direction, such as the case with concentric rings. Other arrangements, such as those where the laser deposition layers are built in a spiral, helical, etc. configuration are also possible. The previous discussion of additive manufacturing techniques, tailored composition gradients, lattice or grid-like structures, interlayer surface area, etc. may apply to the embodiments of FIGS. 11 and 12 as well.

Figure 13:
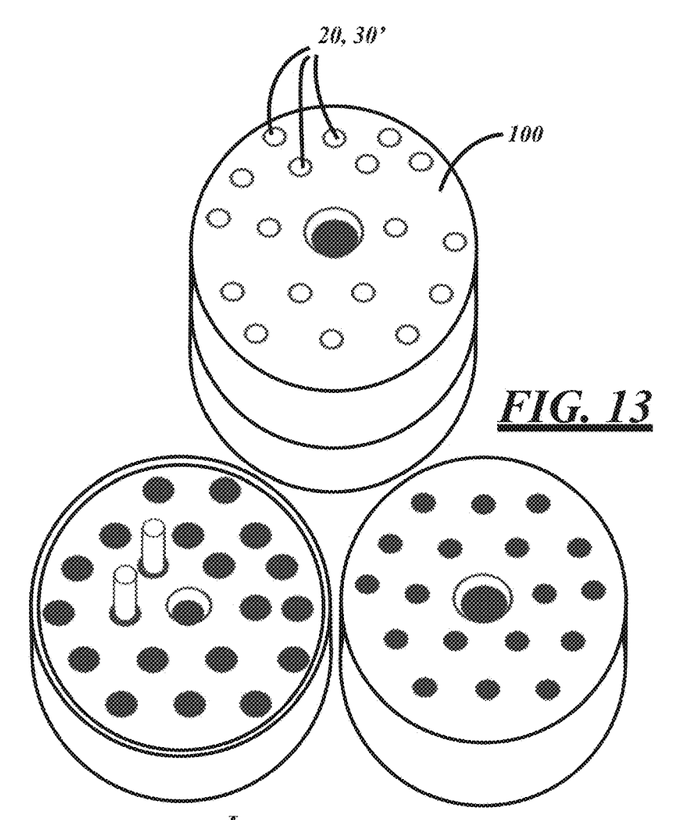
FIGS. 13 and 14 are schematic views of equipment that can be used to build an electrode tip onto an electrode base via an additive manufacturing process.
Figure 14:
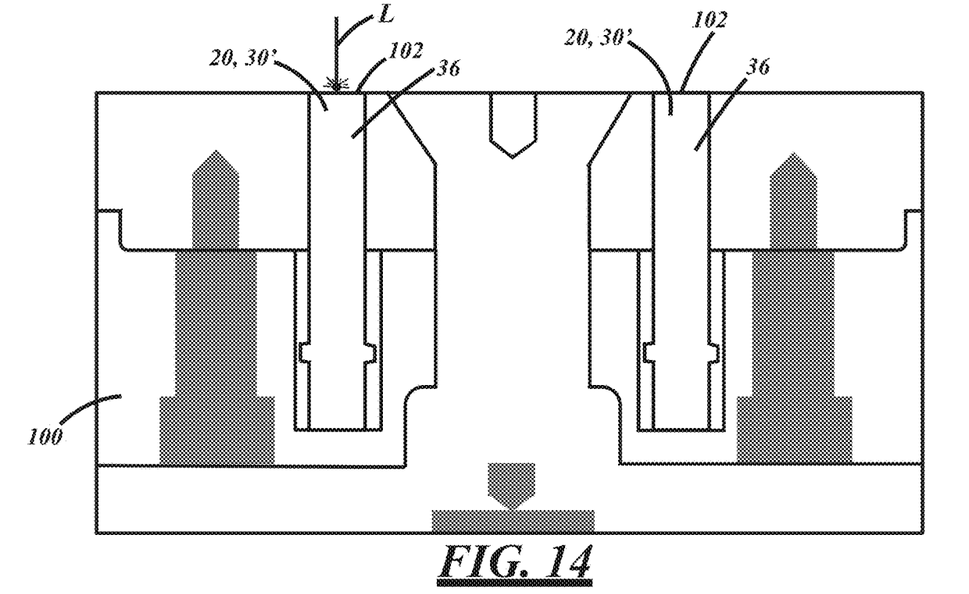

In production, an additive manufacturing process (sometimes referred to as 3D printing processes), such as those that use powder bed fusion techniques, may be used to form or build an electrode tip on an electrode base. According to a non-limiting example of a powder bed fusion process that is illustrated in FIGS. 13 and 14, a main electrode body 36 is secured within a tool 100 such that a firing end 20 with an electrode base 30' are exposed. The exposed electrode base 30' is then covered by a powder bed 102 that includes a first mixture of precious metal-based material; the first mixture preferably includes at least 50% precious metal-based material, such as one includes iridium or platinum. Now that the electrode base 30' is covered with a thin layer of powder, a laser L is selectively directed to the axial end surface of the covered electrode base. The laser L may follow any number of suitable patterns, including the lattice or grid-like pattern 80 that includes a series of rows 82 and columns 84. At each location where the laser L is energized and impinges the powder layer, the laser melts or sinters the powder in that area so that it fuses into the underlying layer(s). This process begins with the initial laser deposition layer 50, at which point the laser L also melts a portion of the underlying electrode base 30', which is preferably a nickel-based material, such that the nickel-based material of the electrode base and the precious metal-based material of the powder intermix and solidify together. The process ends with the final laser deposition layer 60, which constitutes at least part of a sparking surface of the spark plug electrode. When forming the final laser deposition layer 60, it is unlikely that the laser L will penetrate all the way through the entire electrode tip 32' and into the electrode base 30', as it will probably just penetrate several layers deep into the electrode tip. Of course, the preceding description is only one example of an additive manufacturing process that may be used, as other such processes are certainly possible.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A spark plug electrode, comprising:
    an electrode base;
    an electrode tip that is formed on the electrode base and includes a precious metal-based material; and
    a thermally resilient joint that is located between the electrode base and the electrode tip and includes material from the electrode base and precious metal-based material from the electrode tip, the material from the electrode base and the precious metal-based material from the electrode tip has melted, intermixed together, and solidified in the thermally resilient joint during an additive manufacturing process, wherein the electrode tip and the thermally resilient joint together include a plurality of laser deposition layers, and at least some of the melted, intermixed, and solidified precious metal-based material from the thermally resilient joint is embedded into the electrode base.

2. The spark plug electrode of claim 1, wherein the electrode base is an integral component of a main electrode body, and the electrode base and the main electrode body are made from a same nickel-based material.

3. The spark plug electrode of claim 1, wherein the electrode base is a separate component and is welded to a main electrode body, and the electrode base and the main electrode body are made from a same nickel-based material or a different nickel-based material.

4. The spark plug electrode of claim 1, wherein the electrode tip is a cylindrical component that is formed on an axial end or a side surface of the electrode base.

5. The spark plug electrode of claim 1, wherein the electrode tip is an annular component that is formed on an outer circumferential side of the electrode base.

6. The spark plug electrode of claim 1, wherein the plurality of laser deposition layers have an average layer thickness Y between 20 μm and 60 μm.

7. The spark plug electrode of claim 1, wherein the sum of the plurality of laser deposition layers has an electrode tip height X between 0.1 mm and 1.0 mm.

8. The spark plug electrode of claim 1, wherein the electrode base includes a nickel-based material, and the thermally resilient joint includes both the nickel-based material from the electrode base and the precious metal-based material from the electrode tip.

9. The spark plug electrode of claim 8, wherein the thermally resilient joint includes a first laser deposition layer and a second laser deposition layer that is further from the electrode base than is the first laser deposition layer, the first laser deposition layer has a first proportion of precious metal-based material to total material, the second laser deposition layer has a second proportion of precious metal-based material to total material, and the second proportion is higher than the first proportion.

10. The spark plug electrode of claim 9, wherein the proportion of precious metal-based material to total material in the thermally resilient joint continuously increases from the first laser deposition layer to the second laser deposition layer to form a tailored composition gradient.

11. The spark plug electrode of claim 9, wherein the second laser deposition layer is adjacent the electrode tip, and the second laser deposition layer has a proportion of precious metal-based material to total material that is greater than or equal to 50%.

12. The spark plug electrode of claim 1, wherein the thermally resilient joint creates both a mechanical lock and a metallurgical bond between the electrode tip and the electrode base.

13. The spark plug electrode of claim 12, wherein at least ⅕ (20%) of a total volume of precious metal-based material from the thermally resilient joint and the electrode tip is embedded or sunken into the electrode base.

14. The spark plug electrode of claim 12, wherein the electrode base includes one or more lobe(s), when viewed in cross-section, and the electrode tip is built around the lobe(s) of the electrode base so that the mechanical lock includes the thermally resilient joint located between the electrode base and the electrode tip.

15. The spark plug electrode of claim 12, wherein the electrode base includes one or more column(s), when viewed in cross-section, and the electrode tip is built around the column(s) of the electrode base so that the mechanical lock includes the thermally resilient joint located between the electrode base and the electrode tip.

16. The spark plug electrode of claim 1, wherein the plurality of laser deposition layers are made by additive manufacturing, which uses a powder bed fusion technique to melt or sinter powder onto the electrode base with a laser or electron beam, and then to allow the melted or sintered powder to solidify to become the thermally resilient joint and the electrode tip.

17. A spark plug electrode, comprising:
an electrode base;
an electrode tip that is formed on the electrode base and includes a precious metal-based material; and
a thermally resilient joint that is located between the electrode base and the electrode tip and includes material from both the electrode base and the electrode tip, wherein the electrode tip and the thermally resilient joint together include a plurality of laser deposition layers, and at least some of the precious metal-based material from one or more laser deposition layer(s) of the thermally resilient joint is embedded into the electrode base,
wherein at least one of the plurality of laser deposition layers includes rows formed by a laser as it moves across the spark plug electrode in a first direction and columns formed by the laser as it moves across the spark plug electrode in a second direction, where the laser forms the rows and columns during the creation of a single layer to form a lattice or grid-like pattern.

18. The spark plug electrode of claim 17, wherein the lattice or grid-like pattern includes a plurality of peaks and a plurality of valleys, the plurality of valleys correspond to locations where a laser or electron beam has impinged the electrode, and the plurality of peaks correspond to locations where the laser or the electron beam has not directly impinged the electrode or has impinged the electrode with a power that is reduced or modulated.

19. The spark plug electrode of claim 18, wherein the at least one laser deposition layer with the lattice or grid-like pattern has an interlayer surface area that is greater than or equal to 1.8× a surface area of the same layer if the same layer was perfectly flat.

20. An additive manufacturing process for manufacturing a spark plug electrode, comprising the steps of:
providing an electrode base;
providing powder that includes a precious metal-based material;
positioning the electrode base in a tool and covering an end surface of the electrode base with the powder;
directing a laser or an electron beam at the end surface of the electrode base such that it melts or sinters at least some of the powder and forms a thermally resilient joint on the electrode base;
covering an end surface of the thermally resilient joint with the powder; and
directing the laser or the electron beam at the end surface of the thermally resilient joint such that it melts or sinters at least some of the powder and forms an electrode tip,
wherein the electrode tip is formed on the electrode base and includes the precious metal-based material; the thermally resilient joint is located between the electrode base and the electrode tip and includes material from the electrode base and the precious metal-based material from the electrode tip; the material from the electrode base and the precious metal-based material from the electrode tip has melted, intermixed together, and solidified in the thermally resilient joint during the additive manufacturing process; the electrode tip and the thermally resilient joint together include a plurality of laser deposition layers; and at least some of the melted, intermixed, and solidified precious metal-based material from the thermally resilient joint is embedded into the electrode base.

* * * * *